(12) United States Patent
Koo et al.

(10) Patent No.: US 8,776,828 B2
(45) Date of Patent: Jul. 15, 2014

(54) FLUID DISPENSING ASSEMBLY

(75) Inventors: Yeong-Heng Koo, Auckland (NZ);
Andrew Nicholson Wrigley, Auckland (NZ)

(73) Assignee: Illinois Tool Works Inc., Glenview, IL (US)

( * ) Notice: Subject to any disclaimer, the term of this patent is extended or adjusted under 35 U.S.C. 154(b) by 191 days.

(21) Appl. No.: 13/384,996

(22) PCT Filed: Jul. 1, 2010

(86) PCT No.: PCT/NZ2010/000135
§ 371 (c)(1),
(2), (4) Date: Jan. 19, 2012

(87) PCT Pub. No.: WO2011/010939
PCT Pub. Date: Jan. 27, 2011

(65) Prior Publication Data
US 2012/0138178 A1 Jun. 7, 2012

(30) Foreign Application Priority Data
Jul. 20, 2009 (NZ) ........................................ 578508

(51) Int. Cl.
*F16L 37/23* (2006.01)
*F16L 25/00* (2006.01)
*F16L 37/36* (2006.01)

(52) U.S. Cl.
CPC ...................................... *F16L 37/36* (2013.01)
USPC ................................ 137/614.06; 137/614.03

(58) Field of Classification Search
USPC ................................. 137/614, 614.03–614.06
See application file for complete search history.

(56) References Cited

U.S. PATENT DOCUMENTS

| 3,159,180 | A | | 12/1964 | Courtot et al. |
| 3,201,151 | A | | 8/1965 | Westveer |
| 3,424,181 | A | * | 1/1969 | Morse ...................... 137/614.06 |
| 4,982,761 | A | * | 1/1991 | Kreczko et al. .......... 137/614.03 |
| 5,483,993 | A | * | 1/1996 | Roebelen, Jr. ................ 137/614 |
| 6,041,818 | A | * | 3/2000 | Schadewald et al. ..... 137/614.05 |
| 6,675,833 | B2 | | 1/2004 | Maldavs |

(Continued)

FOREIGN PATENT DOCUMENTS

| EP | 0122987 A1 | 10/1984 |
| GB | 2139304 A1 | 11/1984 |

OTHER PUBLICATIONS

ISR for PCT/NZ2010/000135 dated Nov. 9, 2010.

(Continued)

*Primary Examiner* — Kevin Lee
(74) *Attorney, Agent, or Firm* — Lowe Hauptman & Ham LLP

(57) ABSTRACT

Known fluid dispensers can suffer from the disadvantage of inadvertent disconnection of a connector causing potentially hazardous spillage of fluid. The present invention relates to a fluid dispensing assembly comprising a tap and a connector body. The tap comprises a first valve, movable between an open and closed position to allow fluid flow through; and a first portion of an interlocking coupling, configured for rotational engagement with a second complementary interlocking coupling portion of the connector body by rotation about a first fluid dispensing assembly axis. The connector body also comprises a second valve, movable between an open and closed position to allow fluid flow through. By this configuration, the first and second interlocking coupling portions remain interlocked preventing disconnection of the connector body from the tap unless the first and second valves are both in the closed position.

20 Claims, 7 Drawing Sheets

(56) References Cited

U.S. PATENT DOCUMENTS 7,237,760 B1 * 7/2007 Chiu ................... 137/614.03
7,918,243 B2 * 4/2011 Diodati et al. ........... 137/614.03

OTHER PUBLICATIONS

Prior search results for New Zealand patent application No. 578508 dated Mar. 4, 2011.

* cited by examiner

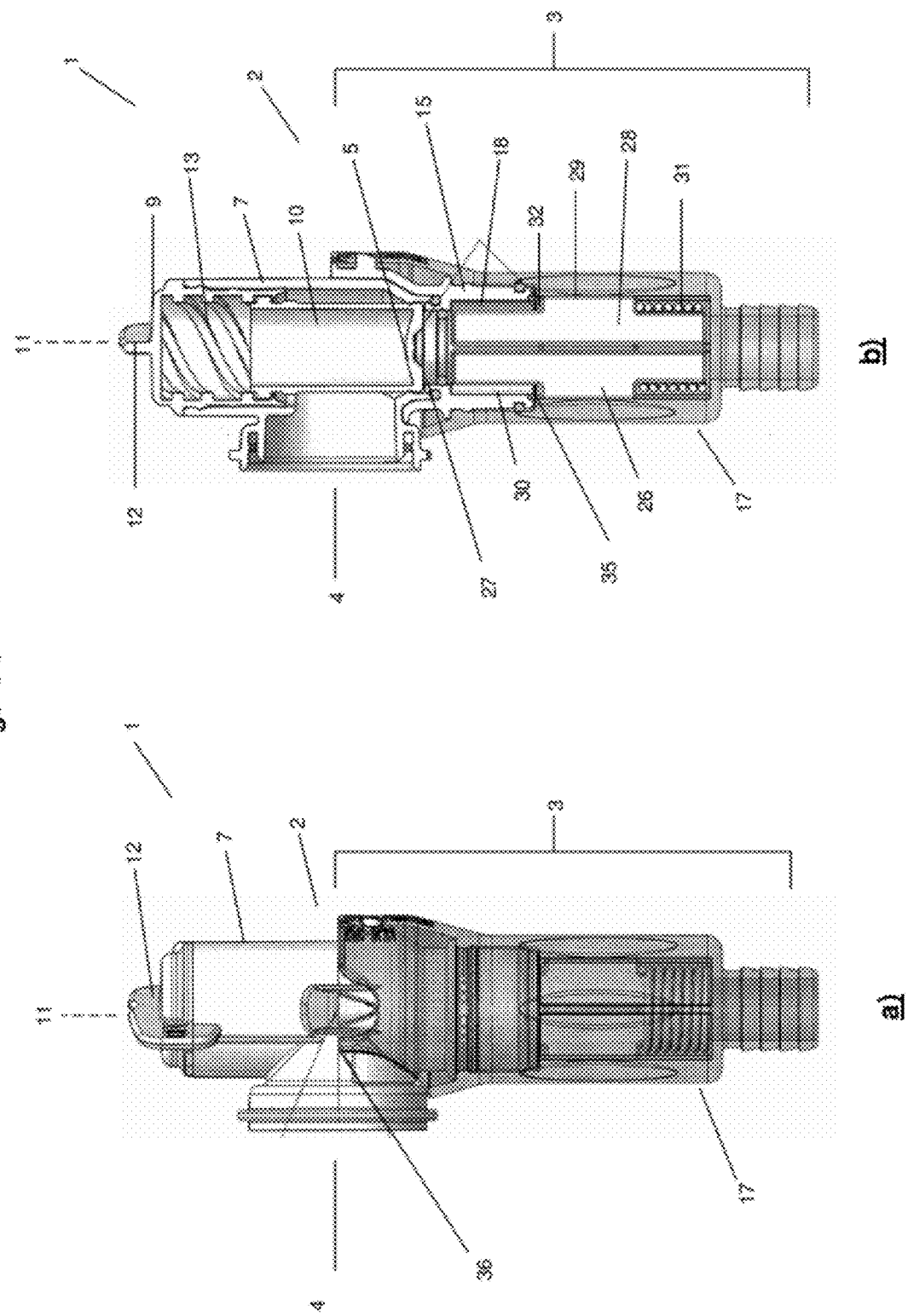

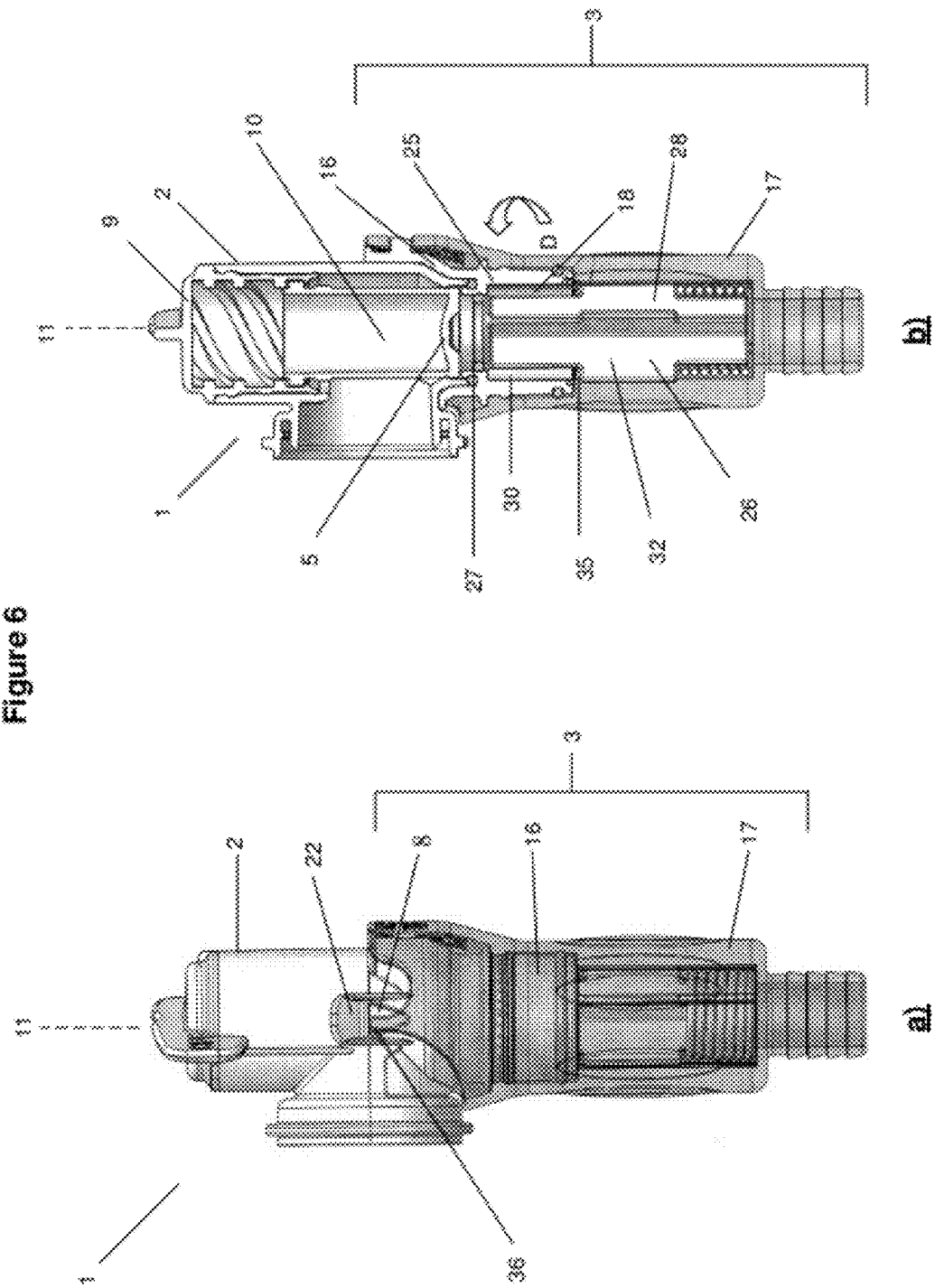

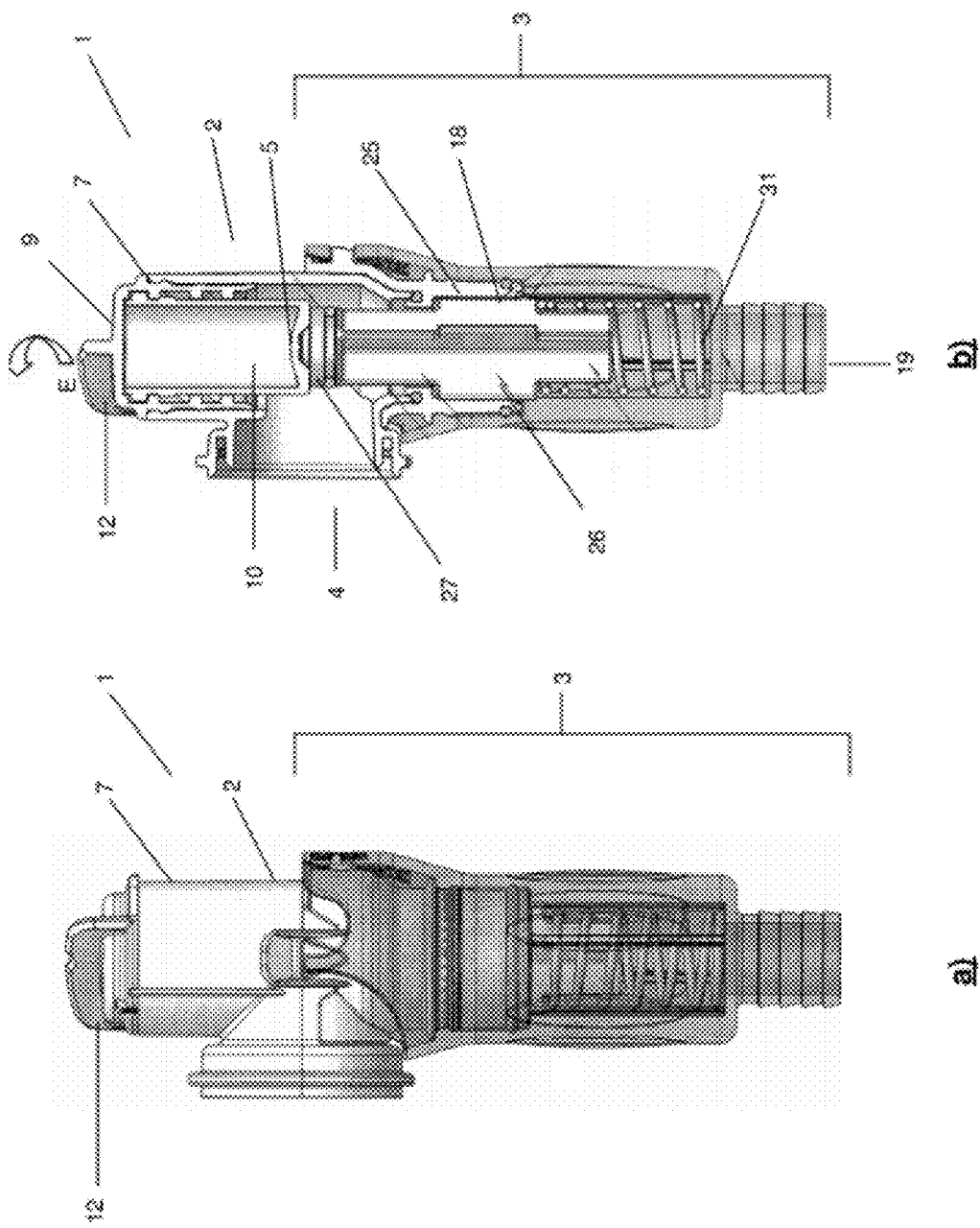

FLUID DISPENSING ASSEMBLY

STATEMENT OF CORRESPONDING APPLICATIONS

The present invention is national phase of PCT/NZ2010/000135 filed Jul. 1, 2010, and based on the provisional application filed in relation to New Zealand Patent Application Number 578508 filed Jul. 20, 2009.

TECHNICAL FIELD

The present invention relates generally to a fluid dispensing assembly comprising a valve body connectable via a connector to a fluid conduit such as a hose. In particular, the present invention relates to a fluid dispensing assembly where the valve body and connector can only be disconnected from the valve conduit when the valve body valve is closed thereby avoiding causing excessive spillage of fluid present in the connector conduit.

BACKGROUND ART

The increasingly stringent regulatory standards for handling of toxic fluids have given rise to the need for reliable and secure means to dispense fluids without environmental contamination. Numerous known systems exist for connecting a fitting such as a hose fitting to a tap on a liquid reservoir, whereby after coupling, and opening the tap, fluid flows through the hose. Disadvantages include the possibility of inadvertent release of the hose fitting coupling from the tap whilst the tap is still open, thereby causing unwanted and potentially hazardous spillage. Furthermore, any residual fluid left in the connector body upstream of the connector valve is also at risk of leakage and environmental contamination.

Moreover, it is possible to disconnect the tap fitting from the connector whilst the tap valve is still open, with a significant attendant risk of spillage.

It is an object of the present invention to address the foregoing problems or at least to provide the public with a useful choice.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

DISCLOSURE OF INVENTION

According to one aspect of the present invention there is provided a fluid dispensing assembly comprising:
a valve body comprising:
  a first valve, movable between an open and closed position by an actuator to respectively allow fluid flow through, and obturation of, a valve body fluid outlet; and
  a first portion of an interlocking coupling, configured for rotational engagement with a second complementary interlocking coupling portion by rotation about a first fluid dispensing assembly axis;
a connector body connected to the valve body to allow restricted relative rotational movement about the first fluid dispensing assembly axis comprising:
  a second valve, movable between an open and closed position to respectively allow fluid flow through, and obturation of, a connector body fluid inlet; and
  a second portion of the interlocking coupling, configured for rotational engagement with the first interlocking coupling portion by rotation about the first fluid coupling assembly axis;
wherein
the first and second interlocking coupling portions remain interlocked preventing dispensing of fluid from the fluid dispensing assembly unless the first and second valves are both in the closed position.

Preferably, the fluid dispensing assembly also comprises a control element, attached to the second valve and retained within the connector body assembly for restricted linear and rotational movement along, and about, the first fluid coupling assembly axis.

The actuator may take any practical form comprising, but not limited to, two mutually engaged threaded elements, an over-centre lever, cam or the like capable of performing at least linear movement of the valve face.

Thus, the fluid dispensing assembly prevents accidental fluid spillage during disconnection by ensuring the valve body valve cannot be inadvertently left open. It will be appreciated that the fluid inlet and outlet in the connector body assembly may be formed in either of the first or second connector body portions dependent on their configurations and inter-coupling. Similarly, the first or second connector body portions may be attached to each other in a variety of configurations e.g. with either portion fitting substantially inside the other, or forming a mutual external housing surface from both body portions.

Preferably, in the fluid dispensing position, movement of the first valve between the open and closed positions bears directly on the second valve to cause a consequential movement of same between the second valve open and closed positions. In a preferred embodiment, the first and second valves include a valve stem attached to a valve face, movable along the first fluid coupling assembly axis. Preferably, obturation of the valve body and connector body fluid outlet is effected by contact of the first and second valve faces with a corresponding valve seat located at each fluid outlet.

Consequently, the absence of any appreciable interleaved fluid volume between the two valve faces in their respective closed positions prevents spillage of such fluid when the valve body and connector body are separated.

According to another aspect, in the fluid dispensing position the valve body and second valve are interlinked for combined rotational movement with respect to the first and second connector body portions. In a preferred embodiment, the interlinking is effected via complementary male and female fittings on the valve body and second valve respectively, comprising, but not limited to lugs and grooves, projections and recesses, clips, dovetails and the like.

Preferably, the second valve and control element are biased toward the open position by a biasing means, e.g. a compression spring, elastomeric material or the like. In a preferred embodiment, the second valve and control element are connected, or formed, together.

According to a further aspect, the control element is constrained for linear movement along and rotate about, the first fluid coupling assembly axis. Preferably, the control element is constrained from rotational movement with the combined rotational movement of the valve body and second valve.

According to one aspect, the constrained rotational movement of the control element is constrained between a first and second radial position corresponding to movement of the second valve between the open and closed positions respectively.

Preferably, the linear movement of the control element and second valve assembly is constrained between;
- a first position corresponding to the fluid dispensing position with the second valve in the open position with the valve face distal to the connector body assembly fluid inlet, and
- a second position corresponding to the disconnected position with the second valve in the closed position with the valve face obturating the connector body assembly fluid inlet;

wherein movement between the first and second radial positions is obstructed unless the control element is positioned along the first axis such that the second valve obturates the connector body fluid inlet.

In one embodiment, the constraints on linear movement of the control element along the first fluid coupling assembly axis is provided by interaction between laterally enlarged control element projections extending longitudinally parallel to the first axis (e.g. the limbs of an X-shaped extrusion) constrained within elongated slots located in the first and second connector body portions and orientated parallel to the first axis, wherein in the first and second radial positions, the first and second connector body portion slots are axially aligned, and offset, respectively. According to one embodiment, the control element is further constrained from rotational movement from the second to the first position by at least one projection on the control element biased into engagement with a corresponding indent in the first connector body.

Preferably, the projection is a shoulder projection on each laterally enlarged control element limb projection.

Preferably, engagement of the shoulder projection with an indentation prevents rotation of the control element with respect to the connector body about the first axis, disengagement of the shoulder projection being effected by movement of the control element along the first axis against the force of the biasing means.

Thus, in the first radial position, the laterally enlarged control element projections are retained within the second connector body portion slots to rotate in unison therewith about the first axis to the second radial position. As the control element is biased towards the valve body by the biasing means, when rotated to the second radial position, the control element is forced along the first connector body slots aligned with the second connector body slots. The travel of the control element along the first axis is governed by the position of the first valve face, in biased contact from the second valve face attached to the control element.

According to one embodiment, the first and second interlocking coupling portions interlock by linear movement along the first axis and/or rotation about same between the first and second radial positions. It will be appreciated by a person skilled in the art that the interlocking coupling may take any convenient form comprising tabs, slotted pins, clips, and the like. In a preferred embodiment, the interlocking coupling portions are a projection located on each of opposing sides of the valve body and corresponding tabs located on opposing sides of the second connector body, such that connection involves biasing of the tabs of the second connector body linearly along the first axis over the projections of the valve body.

The projections prevent the tabs being extracted by a linear movement along the first axis when in the first radial position, while the male and female fittings interlinking the valve body and first connector body portion prevent any rotation due to the engagement of the control element with the slots in both the first and second connector body portion, which is in turn only possible when the valve body valve face is in a position to obturate the valve body fluid outlet.

In a more preferred embodiment, the first connector body portion also comprises at least one raised portion extending from the upper edge of the first connector portion which is configured to overlap the tabs of the second connector body portion after the rotation of the second connector body portion with respect to the interlocked valve body and the first connector body portion.

Preferably, the first connector body portion and second connector body portion are provided with a first visual indicator. More preferably, the first visual indicator may be in the form of a pin extending from the outer surface of the first connector body portion and configured to pass through a corresponding slot in the body of the second connector body portion. In this way movement of the second connector body portion relative to the first connector body portion will move the pin in relation to the slot. Markings on the body of the second connector body portion proximal to the extremities of the slot indicate a valve open position and a valve closed position, based on the relative position of the pin of the first connector body portion in the slot of the second connector body portion.

Preferably, the valve body and second connector body portion are provided with a second visual indicator. More preferably, the second visual indicator may be in the form of a pointer extending from the upper edge of the second connector body portion and a corresponding aligned marking on the outer surface of the valve body. In this way, alignment of the marker with the marking would indicate that the first and second valves are closed. Conversely, absence of alignment of the pointer with the marking would indicate that the first or first and second valves are open.

It can be thus seen the present invention offers notable advantages over the prior art which comprise:
- security of use and reduction of spillage risk during disconnection of a connector from a tap fluid supply; and
- simplified construction with a minimum of moving parts to enable a decreased cost of manufacture and ease of assembly.

BRIEF DESCRIPTION OF DRAWINGS

Further aspects of the present invention will become apparent from the following description which is given by way of example only and with reference to the accompanying drawings in which:

FIG. 5a) shows a side view of a connected valve body and connector as shown in FIG. 3b) with the valve body in a closed position relative to the connector and the connector tap closed;

FIG. 5b) shows a side sectioned view of a disconnected valve body and connector as shown in FIG. 5a) with the valve body in a closed position relative to the connector and the connector tap closed;

FIG. 6a) shows a side view of a connected valve body and connector as shown in FIG. 3c) with the valve body in an open position relative to the connector and the connector tap closed;

FIG. 6b) shows a side sectioned view of a connected valve body and connector as shown in FIG. 6a) with the valve body in an open position relative to the connector and the connector tap closed;

FIG. 7a) shows a side view of a connected valve body and connector as shown in FIG. 3d) with the valve body in an open position relative to the connector and the connector tap open, and FIG. 7b) shows a side sectioned view of a connected valve body and connector as shown in FIG. 7a) with the valve body in an open position relative to the connector and the connector tap open.

BEST MODES FOR CARRYING OUT THE INVENTION

Figure 1:
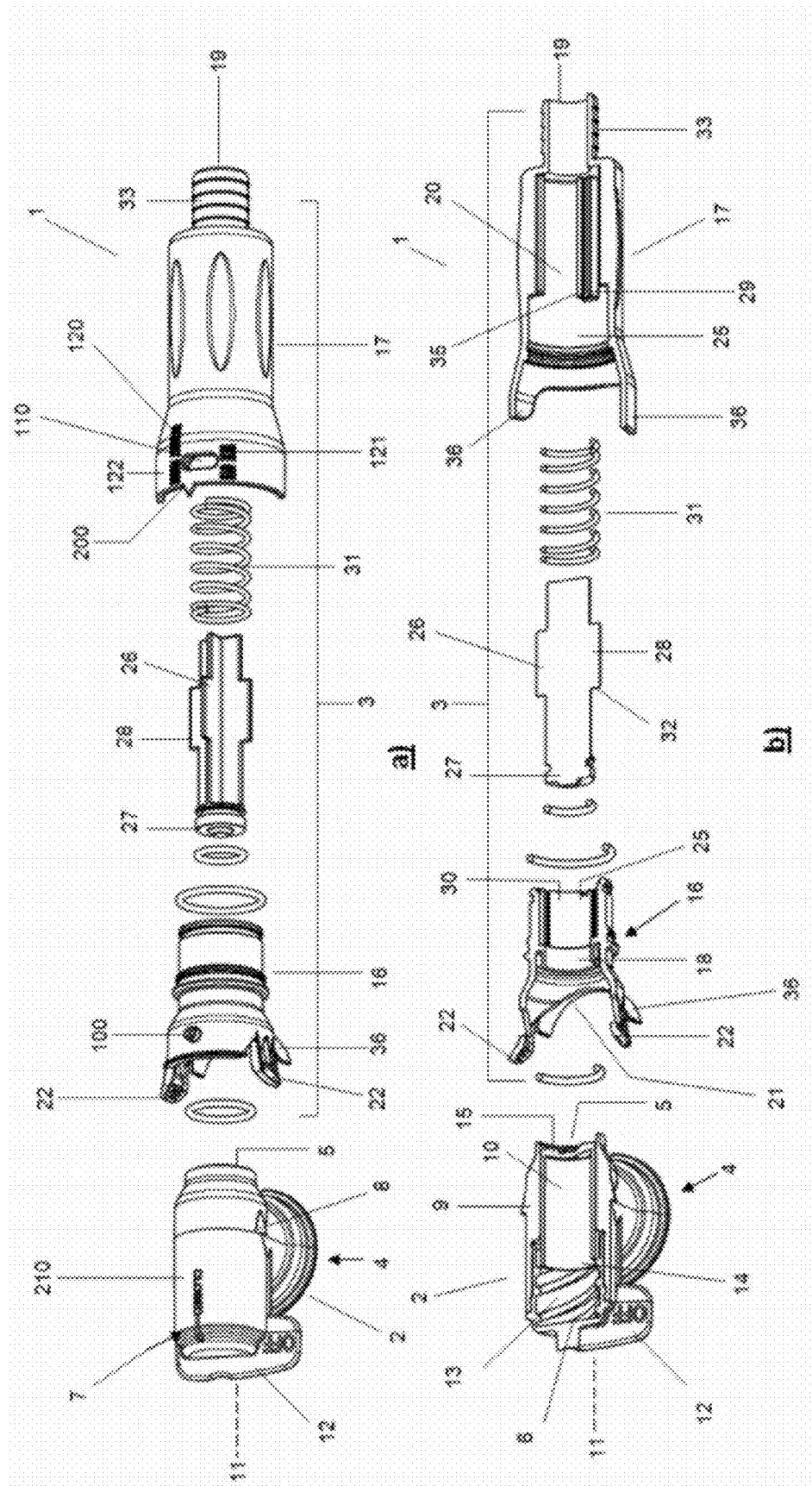
FIG. 1a) shows an exploded view of a preferred embodiment of the present invention in the form of a fluid dispensing assembly.
FIG. 1b) shows an exploded sectioned view of the fluid dispensing assembly as shown in FIG. 1a)

A preferred embodiment of the present invention of a fluid dispensing assembly (1) (shown in an exploded view in FIGS. 1a and 2a and a longitudinal section therethrough in FIGS. 1a and 1b) comprises a first part in the form of a tap (2) releasably connectable to a second part in the form of a connector body (3).

The first valve in the form of a tap (2) includes a fluid inlet (4), a fluid outlet (5) and a fluid passageway (6) therebetween. The tap (2) further includes a valve body (7) and a first portion of an interlocking coupling in the form of a pair of projections (8), positioned substantially adjacent to each other on the external surface of the valve body (2). In the embodiment shown in the drawings, the tap (2) is formed in two parts, namely a substantially cylindrical actuator (9) and a valve head (10). The cylindrical actuator (9) is orientated with its longitudinal axis aligned along a first fluid dispensing assembly axis (11). The cylindrical actuator (9) is closed at one end with a tap handle (12) formed on the outer surface to enable a user to rotate the actuator (9) about the first axis (11).

The opposing end of the cylindrical actuator (9) is open, configured to accept the internal insertion of the valve head (10). The inner wall of the actuator (9) is formed with an internal thread (13) configured to mate with a corresponding thread (not shown) located on the outer surface of the valve head (10). The valve head (10) is also formed as a cylinder with the end distal to the actuator (9) provided with a circular valve face (15). Rotating the tap handle (12) about the first axis (11) causes the valve head (10) to travel along the assembly axis (11) from an 'open position' (with the fluid outlet (5) unobstructed) and a closed position, in which the valve face (15) obturates the fluid outlet (5).

The connector body (3) is comprised of a first and second connector body portion, shown in the preferred embodiment illustrated in the drawings as the first connector body portion (16) and second connector body portion (17) respectively. The two connector body portions (portions 16, 17) attach together to form a connector housing assembly configured to allow restricted relative rotational movement between the two body portions (16, 17) about the first fluid dispensing assembly axis (11). The first and second connector body portions (16, 17) also collectively include a fluid inlet (18), a fluid outlet (19) and a fluid passageway (20) therebetween.

In the embodiment shown, the fluid inlet (18) is formed as part of the first connector body portion (16), while the fluid outlet (19) is formed as a hose connector spigot (33) at the tip of the second connector body portion (17). It will be appreciated however by one skilled in the art that the two connector body portions (16, 17) may be interconnected in a variety of configurations and that the fluid inlet (18) and outlet (19) may be formed on either of, or one of, the connector body portions (16, 17) without departing from the scope of the present invention. In addition, the hose connector spigot (33) of the fluid outlet (19) may be varied in angle with respect to the second connector body portion 17 depending on the particular application of the fluid dispensing assembly (1).

As shown in FIGS. 1a,1b and 2a,2b the first connector body portion (16) is substantially cylindrical, with an arcuate cut-away portion (21) at one end configured to receive a correspondingly shaped portion of the tap (2) fluid inlet (4). The first connector body portion (16) also includes a second portion of the interlocking coupling in the form retaining tabs (22), configured to interlock with the projections (8) of the valve body (7). The interlocking coupling (22 and 8) are configured such that the tap (7) and connector body (3) are releasably connected by insertion of the lugs (8) into the retaining tabs (22), and then rotation of the valve body (7) relative to the connector body (3) about the first axis (11).

The second connector body portion (17) sleeves over the first connector body portion (16) and is fixed from relative linear movement along the first axis (11), whilst being capable of partial rotational movement about the axis (11). The inner sleeve (25) is a substantially cylindrical moulding co-axial with the first axis (11) and provides a fluid tight fit with the second connector body portion (17) and also forms the fluid inlet (18).

The connector body (3) also includes a second valve in the form of a control element (26) comprising a disc-shaped connector valve head (27). The control element (26) is formed as an elongated element orientated co-axially with the first fluid axis (11) retained within the second connector body portion (17) with restricted linear and rotational movement along, and about, the first axis (11). The control element (26) incorporates a laterally enlarged 'x'-shaped section (28) as shown in FIG. 1a, configured to engage within corresponding elongated longitudinal slots (29) in the second connector body portion (17) and slots (30) in the inner sleeve (25).

The control element (26) and connector valve head (27) assembly is linearly movable along the first axis (11) between a position with the valve head (27) obturating the fluid inlet (18) (best shown in FIG. 6b) and a position (shown in FIG. 7b) with the valve head (27) projecting from the first connector body portion (16) with the fluid inlet (18) open. A compression spring (31) biases the control element (26) and connector valve head (27) assembly toward the open position.

The above-described fluid dispensing assembly (1) provides a spillage mitigation means of safely connecting and disconnecting a tap (2) such as a typical fluid tap from a connector (3) such as commonly used as an end fitting for a hose or other similar fluid conduit. Particularly in applications utilising hazardous chemicals, it is important under typical regulatory health provisions, and from a physical and environmental safety perspective to avoid any spillage or contamination from such fluid dispensers (1). The present invention addresses these issues by ensuring the valve body (7) cannot be left open when the connecter body (3) is disengaged from the valve body (7), whilst also eliminating fluid voids in the connector body (3) capable of discharging any retaining fluid upon disengagement.

The connection sequence between the valve body (7) and connector (3) is illustrated in FIGS. 3a-d and FIGS. 4a, b to 7a, b, as described below. FIGS. 3a-d show both a side elevation and a sectioned view through the same elevation at four stages, i.e., with the valve body (7) and connector (3):

a. disconnected (prior to connection);
b. the valve body (7) and connector (3) connected after axial movement of the connector (3) towards the valve body (7) in the direction of the arrow A;
c. the valve body (7) and connector (3) connected, with the second connector body portion (16) rotated relative to the first connector body portion (17) in the direction arrow B; and
d. the valve body (7) and connector (3) connected with the valve body (7) of the tap (2) opened relative to the connector (3) in the direction of arrow C.

A person skilled in the art will appreciate that other methods of operation of the fluid dispensing apparatus 1 will be possible without departing from the scope of the present invention. For example, steps c. and d. may be combined to enable one-handed operation of the valve body (4) and connector (3) whereby rotation of the valve body (7) of the tap (2) relative to the connector (3) automatically applies a torque resistance to the second connector portion (16) to rotate relative to the first connector body portion (17).

Figure 4:
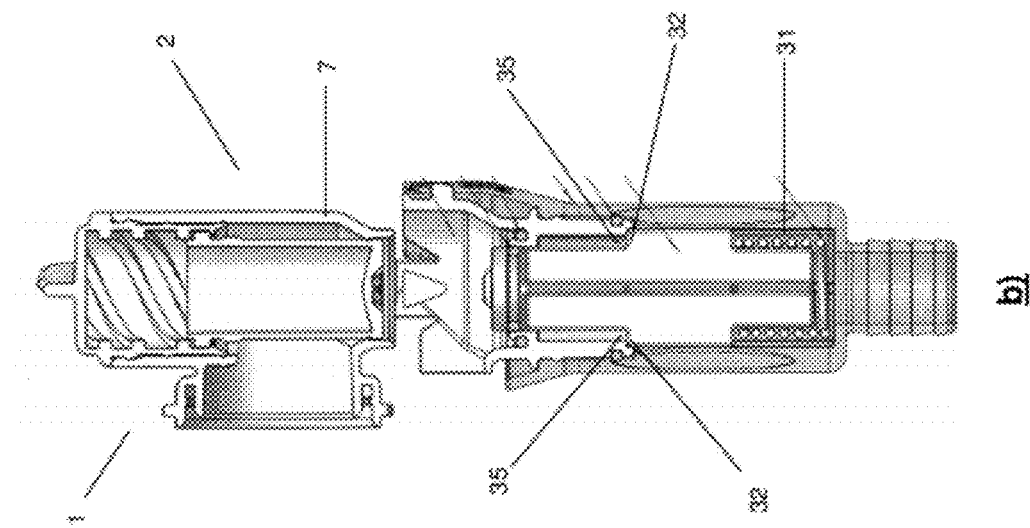
FIG. 4a) shows a side view of a disconnected valve body and connector as shown in FIG. 3a)
FIG. 4b) shows a side sectioned view of a disconnected valve body and connector as shown in FIG. 4a)
Figure 4:
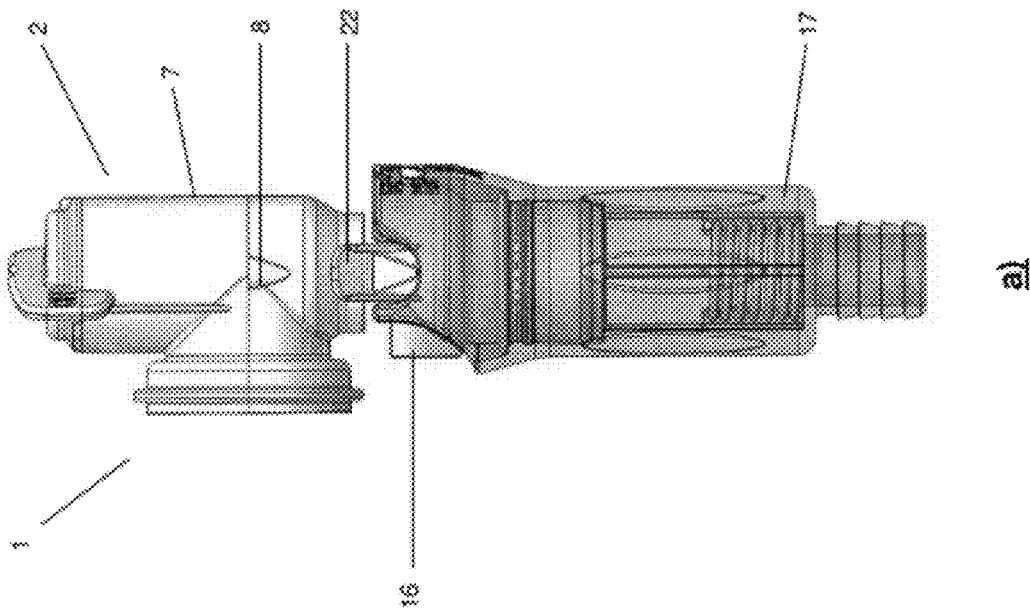

FIGS. 4a, b to 7a, b show the same sequence as FIGS. 3a-d, illustrated from a viewpoint orthogonal to the views shown in FIGS. 3a-d).

FIGS. 4a, b show the tabs (22) of the first connector body portion (16) in position to be latched over the projections (8) of the valve body (7) to connect the first connector body portion (16) to the second connector body portion (17).

FIGS. 5a, b show the tap (2) in the closed position with the tap handle (12) rotated such that the valve head (10) has travelled to its furthermost extent along the fluid dispensing axis (11) via the internal thread (13) of the actuator (9). The valve face (15) on the valve head (10) seals the fluid outlet (5) preventing any spillage. The tap (2) fluid inlet (4) is attached to a fluid reservoir (not shown) by a standard fitting. The fluid inlet (18) to the connector body (3) is sealed by the valve head (27) located at the end of the control element (26).

The elongate 'X'-shaped cross-section portion (28) of the control element (26) is engaged in the longitudinal slots (29) of the second connector body portion (17), and biased towards the fluid inlet (18) by a spring (31). The 'x'-shaped section (28) of the control element (26) is able to travel along the length of both the elongated longitudinal slots (29) in the second connector body portion (17) and the slots (30) in the inner sleeve (25) when the two slots (29, 30) are aligned, i.e. with the tap (2) and connector (3) connected and the valve body fluid outlet (5) and connector body fluid inlet (18) open. When the tap (2) and connector (3) are disconnected and the inner sleeve (25) is rotated about the first axis (11) relative to the connector (3), the axial misalignment between the slots (29, 30) prevents the limbs of 'x'-shaped section (28) from moving past the junction between the slots (29, 30).

To release the 'x-shaped' section (28) and allow rotation about axis (11) and align both the inner sleeve and connector slots (29, 30) requires the whole control element (26) to be moved along the axis (11) against the force of the spring (31) until the shoulder (32) clears the indentation (35). Thus, to inadvertently open the connector fluid outlet (18) requires both a linear and a subsequent rotational movement of the control element (26) relative to the connector (3) about the first axis (11). Accidental opening of the connector body fluid inlet (18) is thus virtually impossible under normal operating conditions.

Figure 2:
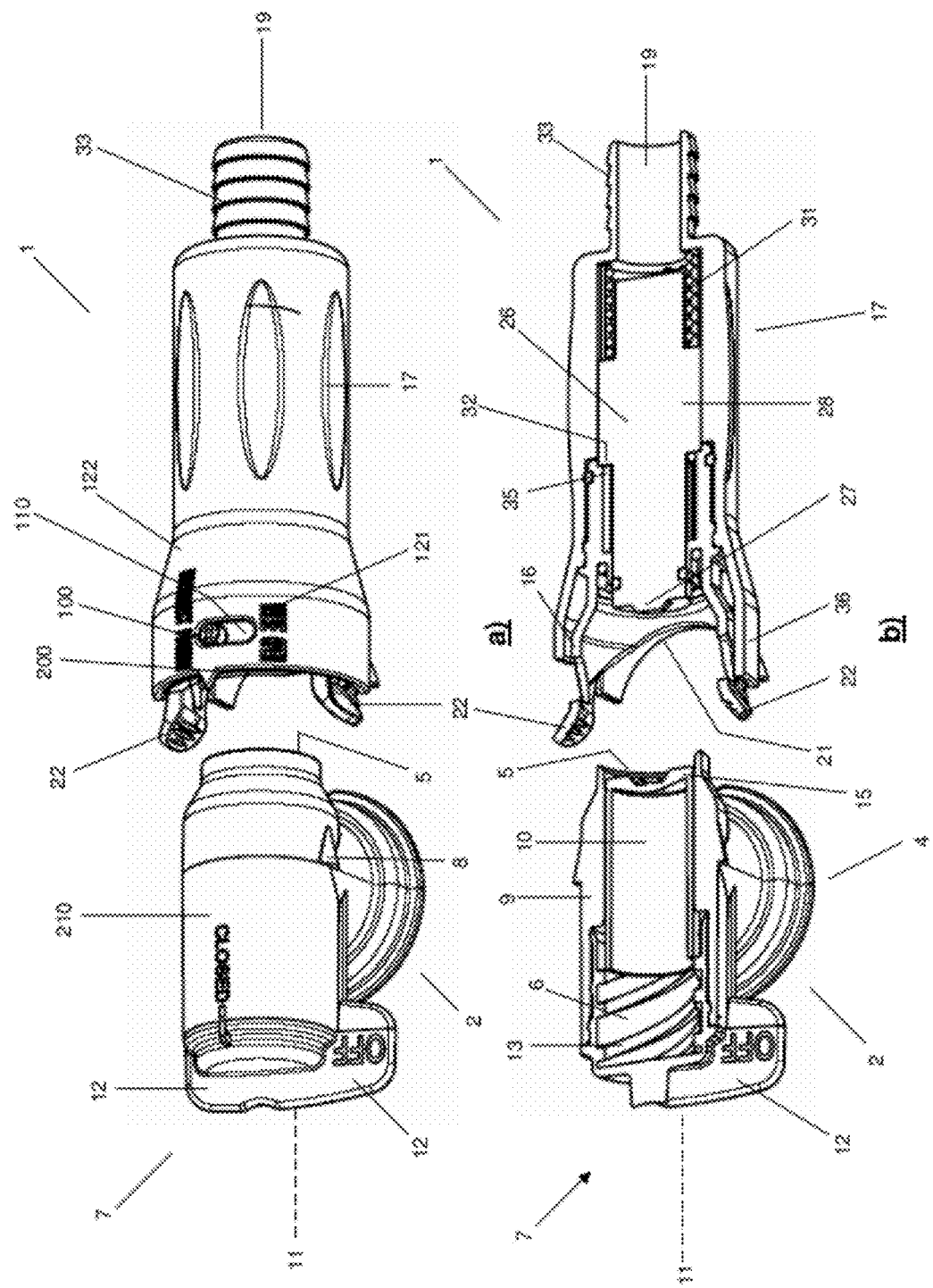
FIG. 2a) shows a perspective elevation of a disconnected valve body and connector as shown in FIG. 1a)
FIG. 2b) shows a perspective side sectioned elevation of the disconnected valve body and connector as shown in FIG. 2a)
Figure 3:
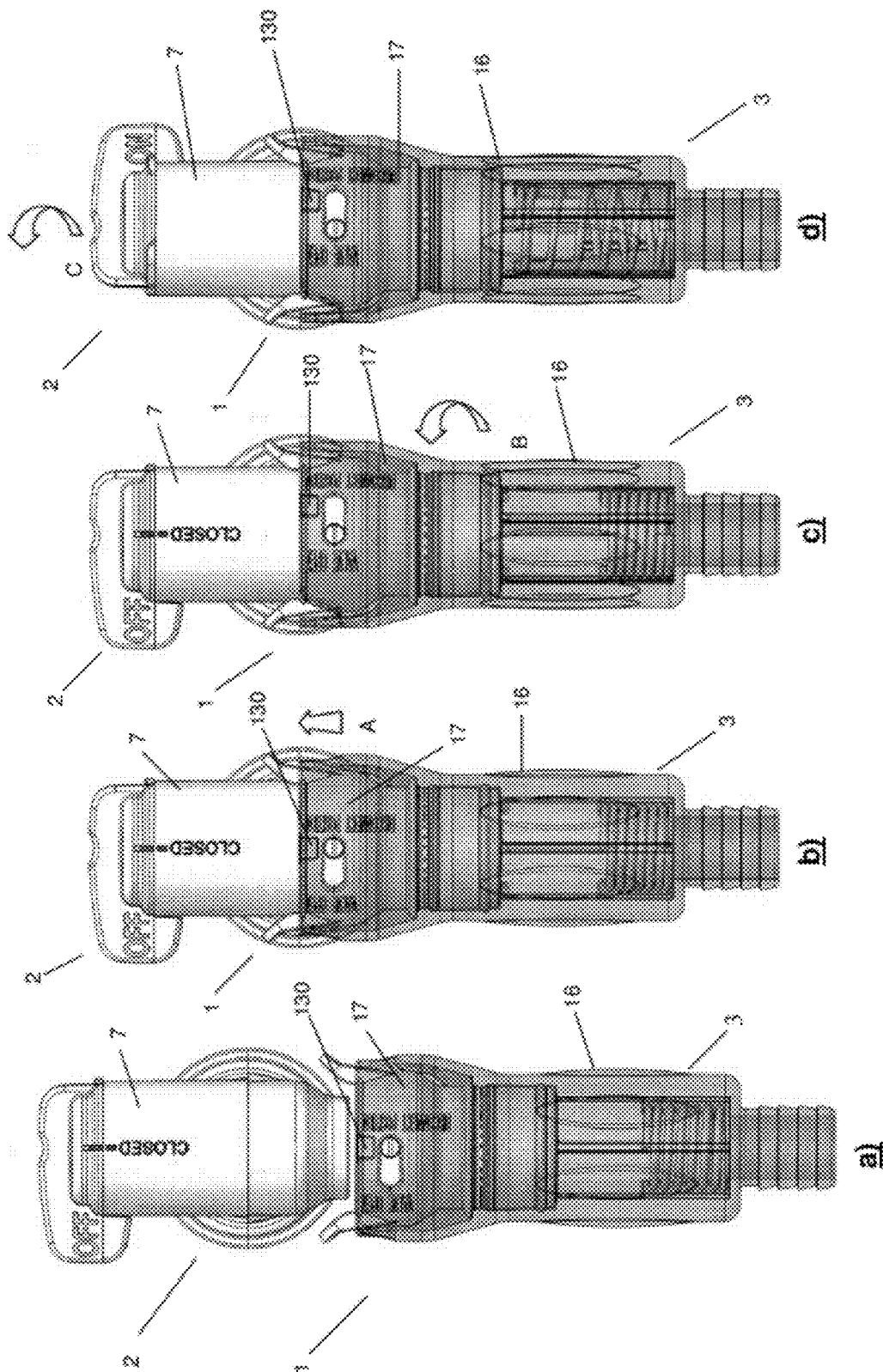
FIG. 3a) shows a front view of a disconnected valve body and connector as shown in FIG. 2a)
FIG. 3b) shows a front view of a connected valve body and connector as shown in FIG. 3a) with the valve body in a closed position relative to the connector and the connector tap closed.
FIG. 3c) shows a front view of a connected valve body and connector as shown in FIG. 3b) with the valve body in an open position relative to the connector and the connector tap closed.
FIG. 3d) shows a front view of a connected valve body and connector as shown in FIG. 3c) with the valve body in an open position relative to the connector and the connector tap open.

A further optional safety feature is the provision of the fluid dispensing apparatus 1 with at least one visual indicator to aid a user in visually determining whether the tap (2) and second connector body portion (17) are in an open dispensing position or closed non-dispensing relative to one another (as shown in FIGS. 1a and 2a. A first visual indicator in the form of a pin (100) extending from the outer surface of the first connector body portion (16) and configured to pass through a corresponding slot (110) in the body of the second connector body portion (17). In this way movement of the second connector body portion (17) relative to the first connector body portion (16) will move the pin (100) in relation to the slot (110). Markings (120) on the body of the second connector body portion (17) proximal to the extremities of the slot (110) indicate a valve open position (121) and a valve closed position (122), based on the relative position of the pin (100) of the first connector body portion (16) in the slot (110) of the second connector body portion (17). A recess (130) in the inner surface of the second connector body (17) (shown in FIGS. 3a-d) facilitates sliding of the pin (100) of the first connector body portion (16) into the slot (110) of the second connector body portion (17) during assembly of the connector (3).

A second visual indicator is in the form of a pointer (200) extending from the upper edge of the second connector body portion (17) and a corresponding aligned marking (210) on the outer surface of the valve body (7). In this way, alignment of the pointer (200) with the marking (210) indicates that the first valve in the form of tap (2) and second valve in the form of control element (26) are closed relative to one another. Conversely, absence of alignment of the pointer (200) with the marking (210) would indicate that the tap (2) control element (26) are open.

A person skilled in the art will appreciate that the form of the first (100) and second (200) visual indicators may be varied without departing from the scope of the present invention. For example, a second visual indicator (200) could be provided as a marking to indicate open flow and located on the first connector body portion (16) proximal to the pin (100) which is only visible when second connector body portion (16) is rotated relative to the first connector body portion (17).

FIGS. 6a, b show the tap (2) and connector body (3) joined together with the tabs (22) biased onto the projections (8) to the maximum extent of their allowable travel in the direction of the first axis (11). The control element (26) is also forced into the connector body (3) along the first axis (11) which moves the shoulders (32) free from rotational restraint by the indents (35) in the inner sleeve (25). In this way the control element (26) is locked relative to the first connector body portion (16), and the valve body fluid outlet (5) and connector body fluid inlet (18) remain sealed by the respective valve heads (10, 27).

Rotating the tap (2) relative to the first connector body portion (16) about the first axis (11) in the direction of arrow C causes the second connector body portion (17) of the connector body (3) to rotate in concert with the tap (2) (as shown in FIG. 6b in the direction of arrow D). The rotation causes the shoulder (32) at the tip of each limb of the 'X'-shaped cross-section (28) to be moved out of alignment with a corresponding indent (35) and into alignment with slots (30) in the inner sleeve (25).

The rotation also causes the tabs (22) to be protected from access by a user of the fluid dispensing assembly (1) by a tab protector portion (36) extending from the upper edge of the first connector body portion (16) (as shown in FIG. 6a).

The control element (26) is thus biased into the inner sleeve (25) by the effects of spring (31) acting to push the valve head (27) free of the connector fluid inlet (18) as shown in FIG. 7a, b). However, the travel of the control element (26)/connector valve head (27) is restricted when the tap (2) and connector (3) are interlocked by the presence of the valve body valve head (10) in abutting contact with the connector valve head (27). Turning the tap handle (12) (in the direction of arrow E as shown in FIG. 7b) into the fluid dispensing position causes the tap (2) to open, retracting the valve head (10) from the fluid outlet (5) and allows the spring-biased control element (26)/valve head (27) to move free of the connector fluid inlet (18). A continuous fluid passageway is thus formed from the tap (2) fluid inlet (4), through the fluid passageways in both the tap (2) and connector (3) to the connector fluid outlet (19).

The tap (2) and connector (3) are disconnected by reversing the above procedure. It will be noted that as disconnection cannot take place unless both the valve body fluid outlet (5) and the connector fluid inlet (18) sealed ensuring fluid is not inadvertently expelled into the environment from the fluid reservoir (not shown) attached to the valve body fluid inlet (4), nor from residual fluid remaining in the connector (3). Moreover, as the two valve heads (10, 27) are in mutual abutting contact, there remains minimal possibility of any fluid being retained therebetween capable of being released into the environment upon disconnection.

Aspects of the present invention have been described by way of example only and it should be appreciated that modifications and additions may be made thereto without departing from the scope thereof as defined in the appended claims.

We claim:

1. A fluid dispensing assembly comprising:
   a valve body comprising:
      a first valve, movable between an open and closed position by an actuator to respectively allow fluid flow through, and obturation of, a valve body fluid outlet; and
      a first portion of an interlocking coupling;
   a connector body connected to the valve body comprising:
      a second valve, movable between an open and closed position to respectively allow fluid flow through, and obturation of, a connector body fluid inlet; and
      a second portion of the interlocking coupling, configured for rotational engagement with the first portion of the interlocking coupling by rotation about a first fluid dispensing assembly axis;
   wherein
      the first and second interlocking coupling portions remain interlocked preventing dispensing of fluid from the fluid dispensing assembly unless the first and second valves are both in the open position, and
   wherein
      the fluid dispensing assembly also comprises a control element, attached to the second valve and retained within the connector body for restricted linear and rotational movement along, and about, the first fluid dispensing assembly axis after rotational engagement of the first portion of the interlocking coupling with the second portion of the interlocking coupling.

2. A fluid dispensing assembly as claimed in claim 1 wherein obturation of the first valve and the connector body fluid outlet is effected by contact of first and second valve faces with a corresponding valve seat located at the valve body fluid outlet.

3. A fluid dispensing assembly as claimed in claim 1 wherein the second valve and the control element are biased toward the open position by a biasing means.

4. A fluid dispensing assembly as claimed in claim 1 wherein the linear movement of the control element and the second valve is restricted between;
   a first position corresponding to the fluid dispensing position with the second valve in the open position with a valve face distal to the connector body assembly fluid inlet, and
   a second position corresponding to the disconnected position with the second valve in the closed position with the valve face obturating the connector body assembly fluid inlet;
wherein movement between the first and second positions is obstructed unless the control element is positioned along the first fluid dispensing assembly axis such that the second valve obturates the connector body fluid inlet.

5. A fluid dispensing assembly as claimed in claim 4 wherein the control element is further constrained from rotational movement from the second to the first position by at least one projection on the control element biased into engagement with a corresponding indentation in the connector body.

6. A fluid dispensing assembly as claimed in claim 5 wherein the projection is a shoulder projection on at least one laterally enlarged control element limb projection.

7. A fluid dispensing assembly as claimed in claim 5 wherein engagement of the projection with the indentation prevents rotation of the control element with respect to the connector body about the first fluid dispensing assembly axis, disengagement of the shoulder projection being effected by movement of the control element along the first fluid dispensing assembly axis against the force of the biasing means.

8. A fluid dispensing assembly as claimed in claim 1 wherein the valve body and the connector body are provided with a first visual indicator.

9. A fluid dispensing assembly as claimed in claim 8 wherein the first visual indicator is in the form of a pin extending from an outer surface of the connector body and configured to pass through a corresponding slot in the connector body.

10. A fluid dispensing assembly as claimed in claim 8, further comprising a tap, wherein the tap and the connector body are provided with a second visual indicator.

11. A fluid dispensing assembly as claimed in claim 8, further comprising a tap, wherein the second visual indicator is in the form of a pointer extending from an upper edge of the connector body and a corresponding aligned marking on an outer surface of the tap.

12. A fluid dispensing assembly as claimed in claim 1, wherein the fluid dispensing assembly is configured to limit rotational movement of the second valve via positive retention.

13. A fluid dispensing assembly as claimed in claim 1, wherein the fluid dispensing assembly is configured such that the control element limits rotational movement of the second valve via contact of the control element with structure of the connector body that include obstructions that protrude into a rotation path of the control element that would be present in the absence of the obstructions.

14. A fluid dispensing assembly as claimed in claim 1, wherein the fluid dispensing assembly is configured such that the control element limits rotational movement of the second valve via interaction with a slot in the connector body.

15. A fluid dispensing assembly as claimed in claim 1, wherein the control element is a substantially rigid component.

16. A fluid dispensing assembly as claimed in claim 1, wherein the control element is spring biased by a spring, and wherein the control element is configured such that the spring deflects at least substantially more than the control element in the axial direction when a force is applied to the control element.

17. A fluid dispensing assembly as claimed in claim 1, wherein the control element is spring biased by a spring, and wherein the control element is configured such that the spring deflects at least substantially more than the control element in the axial direction when a force is applied to the control element.

18. A fluid dispensing assembly as claimed in claim 1, wherein the fluid dispensing assembly is configured to limit rotational movement of the second valve via structural obstruction.

19. A fluid dispensing assembly as claimed in claim 1, wherein a center structure of the control element is located in the center of the connector body.

20. A fluid dispensing assembly as claimed in claim 1, wherein the control element is an elongate body.

* * * * *